3-157. 424
-25-75

GUILLOTINES AND LIKE SHEARING MACHINES

Original Filed Feb. 17, 1971

United States Patent

Re. 28,345

Reissued Feb. 25, 1975

28,345

GUILLOTINES AND LIKE SHEARING MACHINES

Emile Breetvelt, Johannesburg, Transvaal, Republic of South Africa, assignor to Intermenua (Proprietary) Limited, Johannesburg, Transvaal, Republic of South Africa Original No. 3,757,621, dated Sept. 11, 1973, Ser. No. 116,041, Feb. 17, 1971. Application for reissue Mar. 19, 1974, Ser. No. 452,570

Claims priority, application Republic of South Africa, Feb. 20, 1970, 70/1,132; Sept. 15, 1970, 70/6,300; Oct. 5, 1970, 70/6,732

Int. Cl. B26d *1/00*

U.S. Cl. 83—157 8 Claims

Matter enclosed in heavy brackets [ ] appears in the original patent but forms no part of this reissue specification; matter printed in italics indicates the additions made by reissue.

ABSTRACT OF THE DISCLOSURE

A guillotine machine for shearing metal, power driven or hand operated, including a yieldable supporting element located in a resting position adjacent the loading edge of the first blade in the path of the second blade and a biasing mechanism acting to resist displacement of the support from its resting position as the second blade is advanced over the first blade so that the material cut by the machine is maintained in a flat and untwisted condition requiring no straightening operation.

This invention relates to shearing machines of the kind employed in severing metal plate.

Machines of this kind are generally characterized by a lower stationary blade and an upper moving blade which slides over the lower blade to provide a cutting or shearing action along the leading edges of the blades.

Most arrangements suffer from the disadvantage that during the shearing or cutting action, forces are developed which lead to twisting or buckling of the severed plate portion. Straightening the severed portion requires a further operation which may contribute materially towards manufacturing costs.

Various arrangements have therefore been proposed which have as their object the reduction of the degree of twisting or buckling that occurs during the shearing or cutting operation.

In one arrangement a metal plate shearing machine is provided which has a lower fixed blade and a supporting table extending from adjacent the fixed blade. A blade carrier is mounted for sliding movement over the lower fixed blade, the carrier being provided with a slot. An upper edge of the slot constitutes the upper moving blade of the machine while the lower edge of the slot provides a support against which a plate to be sheared is held. During shearing operations the plate is therefore supported on either side of the line of severance. In another arrangement proposed for cutting billets, a supporting table is pivotally mounted below the moving blade, the supporting table acting to force a billet against the upper cutting blade as it passes over the lower blade.

Other arrangements provide two supporting tables, both tables being stationary with one extending from one side of the lower stationary blade and other spaced from the other side of the same stationary blade to permit the moving blade to pass between the lower blade and the spaced table.

It has also been proposed to provide support for the portion of the plate to be severed through the provision of a series of pistons located along the cutting or shearing edge of the lower blade and below the upper moving blade.

In many cases the proposed arrangements do not reduce materially the degree of twisting or buckling that occurs. Some arrangements rely on complicated mechanisms that are not only costly to construct but are not sufficiently robust to withstand rough workshop usage.

An object of the present invention is the provision of a shearing or cutting machine which will provide a guillotine for severing a plate substantially free from distortion, buckling and twisting and in which the disadvantages mentioned above are materially decreased.

According to the invention there is provided a shearing machine including a first fixed blade and a second blade movable over the first blade to set up a shearing action along their leading edges, a continuous yieldable work support comprising a resilient member which is located in a resting position adjacent the leading edge of the first blade and in the path of the second blade and biasing means acting to resist displacement of the resilient member from its resting position as the second blade is advanced over the first blade.

The invention also provides for the resilient member to be a leaf spring, for the biasing means to be a resiliently loaded mounting, for the leaf spring to be curved in its relaxed condition, the leaf spring bowing with its convex surface facing the second blade and its extremities supported on the mounting and further loading means provided for drawing the spring to a substantially flat position on the mounting with the latter in a position most adjacent the leading edge of the first blade.

Various embodiments of the invention will now be described with reference to the accompanying drawings in which.

Figure 1:
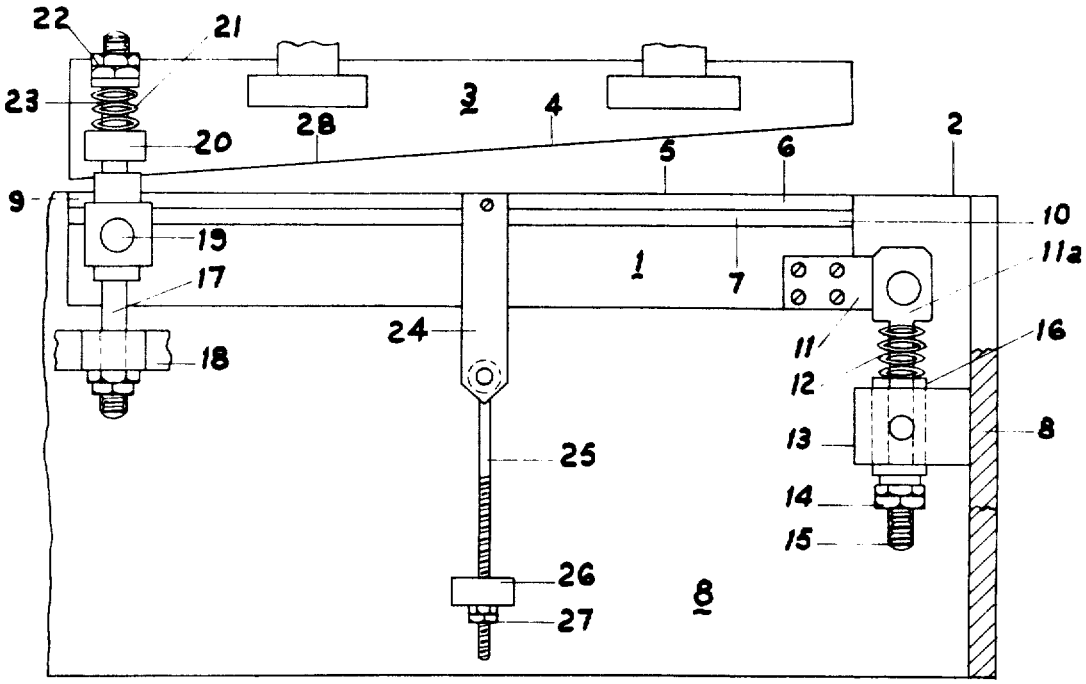
FIG. 1 is a diagrammatic representation of a guillotine provided with the combination of a resiliently loaded mounting supporting a leaf spring which provides the support.
Figure 2:
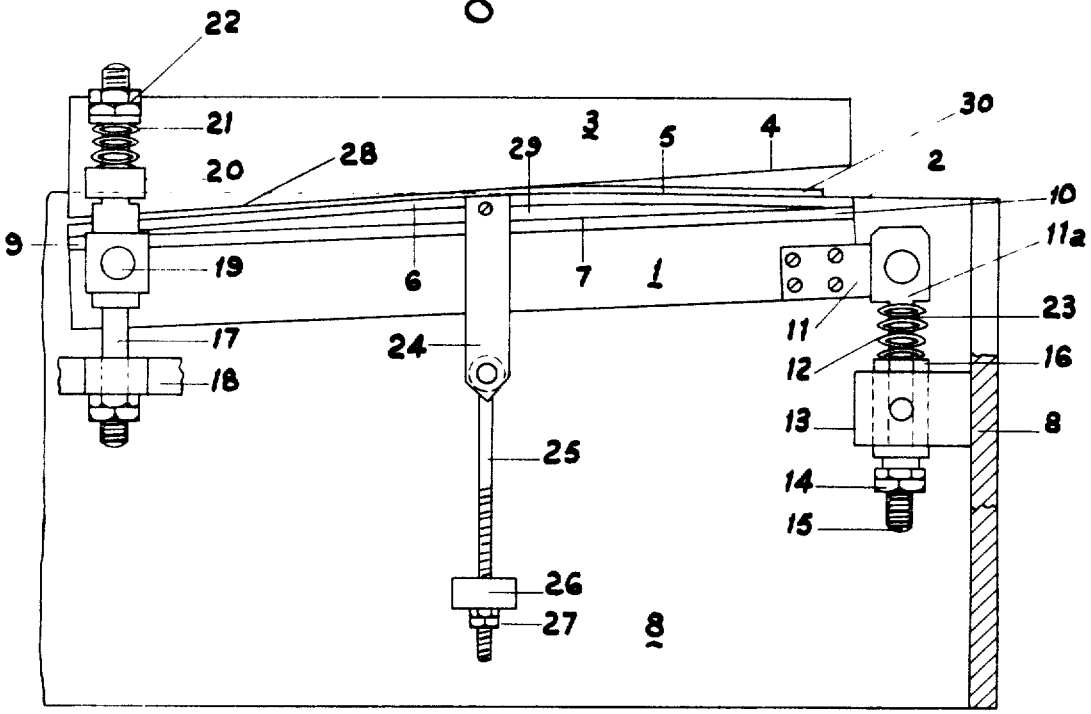
FIG. 2 is a diagrammatic representation of the guillotine of FIG. 1 shown in the course of shearing a metal plate.

In FIGS. 1 and 2 application of the invention to a guillotine is shown.

The guillotine comprises a first stationary blade 1 having a leading edge 2 and a second moving blade 3 having a leading edge 4.

As blade 3 moves across blade 1 a shearing or cutting action is set up between leading edges 2 and 4.

A supporting surface 5 is provided along leading edge 2. The supporting surface 5 comprises a spring blade 6 which rests on a substantially rigid bar 7. The bar 7 is supported adjacent the side of the stationary blade 1 and is connected to the frame 8 of the guillotine at one end 10 and to the movable blade 3 at the other hand 9.

Both these connections allow for a vertical and pivotal movement of the supporting surface 5.

At the end 10 of the bar 7 bracket 11 is provided to which is pivotally connected bolt 11A which passes through spring assembly 12 and mounting 13 fixed to frame 8. Nuts 14 are provided on the free end 15 of the bolt 11A so that the position of the upper supporting surface 5 of bar 7 relative to the leading edge 2 of blade 1 can be varied. A guiding collar 16 is fitted in the mounting 13.

At the opposite end of bar 7 a similar arrangement is made but in this case a bolt 17 is fitted through bracket 18 on frame 8 and through a pivot mounting 19 on bar 7. The bolt 17 extends further through bracket 20 on the movable blade 3, through spring assembly 21 and has adjusting nuts 22 on the end thereof.

The spring assemblies 12 and 21 are conveniently made up from a series of alternately inverted disc springs 23.

Spring blade 6 is bent longitudinally so that when located on bar 7 it is arched with its convex surface facing leading edge 4 of blade 3. The spring 6 is constrained by an embracing bracket 24 which passes over spring 6 around bar 7 and which is pivotally attached to screw threaded rod 25 held in bracket 26 by nuts 27. Nuts 27 on the extremities of rod 25 are tightened to drown down blade 6 until its supporting surface 5 rests in a straight line adjacent leading edge 2 and against bar 7.

As blade 3 advances over blade 1 leading edge 4 moves into contact with supporting surface 5. Further movement of the blade 3 over blade 1 causes contact to be established between leading edge 4 and supporting surface 5 over an increasing length. Furthermore, as blade 3 moves over blade 1 supporting surface 5 is depressed in advance of blade 3.

It will therefore be seen that at any point along the length of leading edge 4 contact is established with surface 5 in the zone of the shearing action. As will be seen from FIG. 2, the importance of this lies in the fact that if a sheet or plate is sheared by the guillotine, support for the sheet or plate is provided in the zone of severance and along the line of severance. This results in a more true line of severance is being obtained.

Not shown in the sketches are guides which constrain downward movement of the spring blade 6 and bar 7.

Adjustment of springs 12 and 21 is made to ensure that the supporting surface 5 only moves after the advance end 28 of moving blade 3 has cut through whatever thickness of plate is being cut in the machine.

The effect of spring blade 6 is that as a gap 29 naturally occurs between bar 7 and blade 3 as the cut is advanced across a sheet 30 of material being cut, the inherent resilience of the spring 6 causes the latter to bow upwardly as indicated in FIG. 2 and thus maintain a direct support for sheet 30 under blade 3.

This has been found to materially reduce the twisting and distortion of cut portion of sheet 30 compared with operations where the resilient support is not provided.

It will be noted that bracket 24 is sufficient to maintain the correct operational relationship between spring blade 6 and support bar 7 but it will be understood that certain guides can be incorporated in the machine if this is deemed desirable.

It will be understood that constructional details of the machine can be varied without departing from the scope of this invention as defined by the appended claims.

I claim:

1. A shearing machine including a first fixed blade and a second blade movable over the first blade to set up a shearing action along their leading edges, a continuous yieldable work support comprising a resilient member which is located in a resting position adjacent and along substantially the length of the leading edge of the first fixed blade in the path of the second blade and biasing means acting to resist displacement of the resilient member from its resting position as the second blade is advanced over the first blade.

2. A shearing machine as claimed in claim 1 in which the resilient member comprises a leaf spring.

3. A shearing machine as claimed in claim 1 in which the biasing means comprises at least one resiliently loaded base member.

4. A shearing machine including a first fixed blade and a second blade movable over the first blade to set up a shearing action along their leading edges, a continuous yieldable work support comprising a leaf spring located in a resting position adjacent to and along substantially the length of the leading edge of the first blade in the path of the second blade and biasing means comparing at least one resiliently loaded base member, which is adapted to resist displacement of the leaf spring from its resting position as the second blade is advanced over the first blade.

5. A shearing machine as claimed in claim 4 in which the leaf spring is bowed and supported in the region of its extremities on a single resiliently loaded base member, the leaf spring having its convex surface facing the second blade and providing the supporting surface of the work support.

6. A shearing machine as claimed in claim 5 in which further loading means is provided which is adapted to draw the leaf spring into a substantially flat position on the base member.

7. A shearing machine as claimed in claim 6 in which the leaf spring is constrained to said substantially flat position by [a] *at least one* bracket adjustably and pivotally attached to the [fixed blade] *frame of the machine.*

8. A shearing machine as claimed in claim 7 in which the base member is carried *on or* between resilient end mountings, one such end mounting being attached to *the* [fixed blade] *moveable blade and the base member* and the other such end mounting being attached to the [moveable blade] *frame of the machine and the base member.*

References Cited

The following references, cited by the Examiner, are of record in the patented file of this patent or the original patent.

UNITED STATES PATENTS

| | | | |
|---|---|---|---|
| 3,600,995 | 8/1971 | Hanni | 83—157 |
| 2,814,343 | 11/1957 | Anderson | 83—157 |
| 294,966 | 3/1884 | Chess | 83—157 |
| 1,000,789 | 8/1911 | Elliott et al. | 83—157 X |
| 2,742,087 | 4/1956 | Smith et al. | 83—157 X |
| 2,973,678 | 3/1961 | Scott et al. | 83—157 X |

WILLIE G. ABERCROMBIE, Primary Examiner

U.S. CL. X.R.

83–694